United States Patent [19]

Haley et al.

[11] Patent Number: 5,093,878
[45] Date of Patent: Mar. 3, 1992

[54] ACTIVE DEVICE MOUNT WITH MARK PREVENTION, ANTI-ROTATION FEATURES AND METHOD OF MAKING SAME

[75] Inventors: Edmund J. Haley, Dillsburg; Robert L. Mansberger, II, Middletown; Robert N. Weber, Hummelstown, all of Pa.

[73] Assignee: AMP Incorporated, Harrisburg, Pa.

[21] Appl. No.: 735,497

[22] Filed: Jul. 25, 1991

Related U.S. Application Data

[63] Continuation-in-part of Ser. No. 624,854, Dec. 10, 1990, Pat. No. 5,044,720.

[51] Int. Cl.⁵ .................. G02B 6/26; H01J 5/16; B29D 11/00
[52] U.S. Cl. .................. 385/92; 385/88; 385/78; 250/227.11; 264/1.5; 264/328.1
[58] Field of Search .................. 385/78, 85, 88, 92; 264/1.5, 328.1, 1.6, 1, 2.3; 250/227.11

[56] References Cited

U.S. PATENT DOCUMENTS

| | | | |
|---|---|---|---|
| 4,118,105 | 10/1978 | Voight | 385/88 |
| 4,173,389 | 11/1979 | Curtis | 385/92 |
| 4,186,995 | 2/1980 | Schumacher | 385/93 |
| 4,377,322 | 3/1983 | Ransley et al. | 385/88 |
| 4,433,898 | 2/1984 | Nastri | 385/91 |
| 4,461,539 | 7/1984 | Bailey et al. | 385/73 |
| 4,515,432 | 5/1985 | Sherwin | 385/88 |
| 4,533,209 | 8/1985 | Segerson et al. | 385/88 |
| 4,539,476 | 9/1985 | Donuma et al. | 385/88 |
| 4,767,178 | 8/1988 | Sasaki et al. | 385/88 |
| 4,814,118 | 3/1989 | Plummer et al. | 385/74 X |
| 4,834,487 | 5/1989 | Abendschein et al. | 385/78 X |
| 4,848,866 | 7/1989 | Feulner et al. | 385/88 |
| 4,907,852 | 3/1990 | Noba et al. | 385/58 |
| 4,934,960 | 6/1990 | Capp et al. | 439/620 |
| 4,979,791 | 12/1990 | Bowen et al. | 385/49 X |
| 5,044,720 | 9/1991 | Haley et al. | 385/88 |

Primary Examiner—Brian Healy

[57] ABSTRACT

An active device mount 1, comprises a body 2 for receiving an optoelectronic device 10 and having a socket 11 for receiving a holder 15 for an optical fiber, an interior and an entrance end of the socket 11 being covered from the entrance end, the lip 17 having exterior mold vestiges 54, and the material 16 preventing a rubbing mark from being applied on the holder 15 by the socket 11. Very small apertures either in the face of body 2 as at 58 or in the side wall of body 2 as at 78 are filled with material 16 during molding to preclude rotation of the material 16 relative to body 2.

8 Claims, 6 Drawing Sheets

# ACTIVE DEVICE MOUNT WITH MARK PREVENTION, ANTI-ROTATION FEATURES AND METHOD OF MAKING SAME This Application is a continuation-in-part of U.S. patent application Ser. No. 07/624,854 filed Dec. 10, 1990, and now U.S. Pat. No. 5,044,720.

FIELD OF THE INVENTION

The invention relates to an active device mount for receiving and aligning an optoelectronic device to a holder for an optical fiber and to a method of molding such mount and providing anti-rotation features between mount elements.

BACKGROUND OF THE INVENTION

U.S. Pat. No. 4,979,791 issued Dec. 25, 1990, discloses an active device mount having a socket for receiving a holder for an optical fiber to be aligned with an active device, known also as an optoelectronic device, mounted in the holder. The holder is comprised of a ceramic, for example, alumina, having a light coloration. Ceramics are a class of materials useful for small precision parts requiring precise dimensions that do not vary appreciably with changes in temperature. Further, ceramics are generally hard substances, and are too hard for shaping by machining tools in widespread industrial use. Manufacturing operations for ceramic precision parts remain highly specialized and expensive, elevating the cost of such parts.

On the other hand, the active device mount can be constructed without unnecessary elevated cost by using materials more susceptible than are ceramics to being shaped by the manufacturing operations widely practiced. For example, stainless steel, a material of less exceptional properties than ceramics, is readily shaped by machining operations to provide a socket with adequate dimensional precision. One disadvantage is observed when the stainless steel has been in rubbing contact with a ceramic, particularly a ceramic of light coloration and inherent abrasiveness. Stainless steel does not itself become visibly marred by an unsightly stain of its own oxide. Yet stainless steel is capable of applying marks by rubbing upon lighter coloration ceramics. The stainless steel of the socket applies visible dark stains or marks upon the ceramic holder whenever the ceramic holder rubs against the socket during its insertion and withdrawal.

SUMMARY OF THE INVENTION

The invention is developed in response to a need for eliminating unsightly marks applied by sockets fabricated from easily shaped metals onto light colored holders for optical fibers. A feature of the invention resides in an interior and an entrance end of the socket being covered with material preventing a rubbing mark from being applied on the holder by the socket. The material is fabricated by molding a polymer material of sufficient rigidity to resist deformation by receipt of the holder in the socket. Molding as a manufacturing process, is widely practiced.

Another feature of the invention resides in the material being molded with a lip projecting from the entrance end, the lip having exterior mold vestiges, the material covering the interior being devoid of mold vestiges. A molding operation will impart mold vestiges on the surface of the material shaped by the molding operation. The vestiges not only are surface imperfections, and further circumvent dimensional precision of the surface on which they appear. According to the invention, mold vestiges appear only at the molded material forming an exterior of a lip on the socket, the exterior having no requirement for dimensional precision. Further according to the invention, precise interior dimensions of the molded part for aligning the ceramic holder in the socket are achieved by an absence of mold vestiges on the interior surface of the molded part. The invention contemplates the provision of means to prevent the rotation of the material molded relative to the socket in a number of different embodiments, including one wherein grooves are made in the interior of the socket and another wherein apertures of very small volume are made in the socket allowing plastic material to flow therein during the molding operation and lock the plastic material to the socket.

U.S. Pat. No. 4,934,960 discloses an electrical connector having insulative polymer material molded in a conductive metal socket. The polymer material provides a mass of electrical insulation and lacks a surface of precise dimensions for precision alignment of a holder of an optical fiber. An optical connector, disclosed in U.S. Pat. No. 4,834,487, in which a unitary alignment ferrule is molded of plastic material, is disclosed with a discussion pertaining to locating mold flash where precise dimensional accuracy is not required.

For an understanding of the invention, reference will now be made by way of example to the following detailed description taken in conjunction with accompanying drawings.

DETAILED DESCRIPTION

Figure 1:
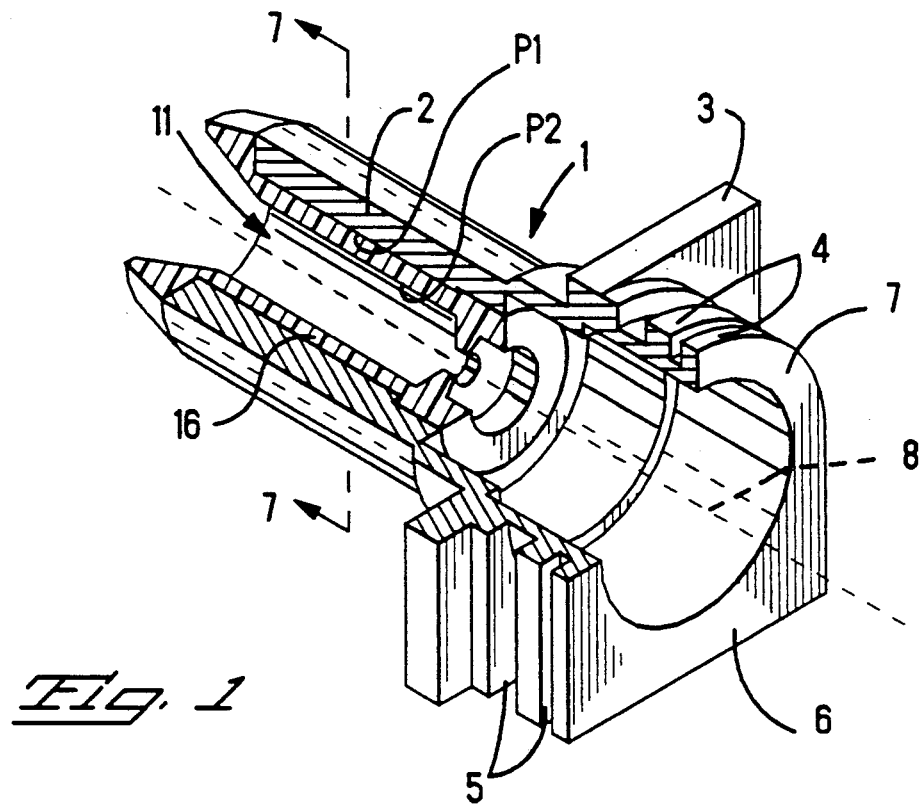
FIG. 1 is a perspective view partially cut away of an active device mount.
Figure 2:
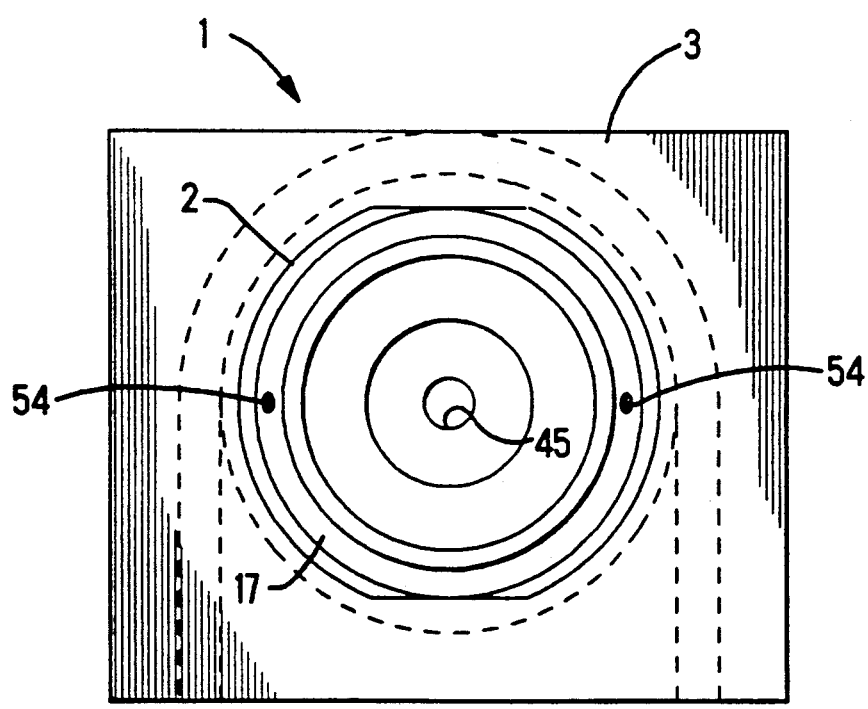
FIG. 2 is an enlarged end view of the active device mount shown in FIG. 1.
Figure 3:
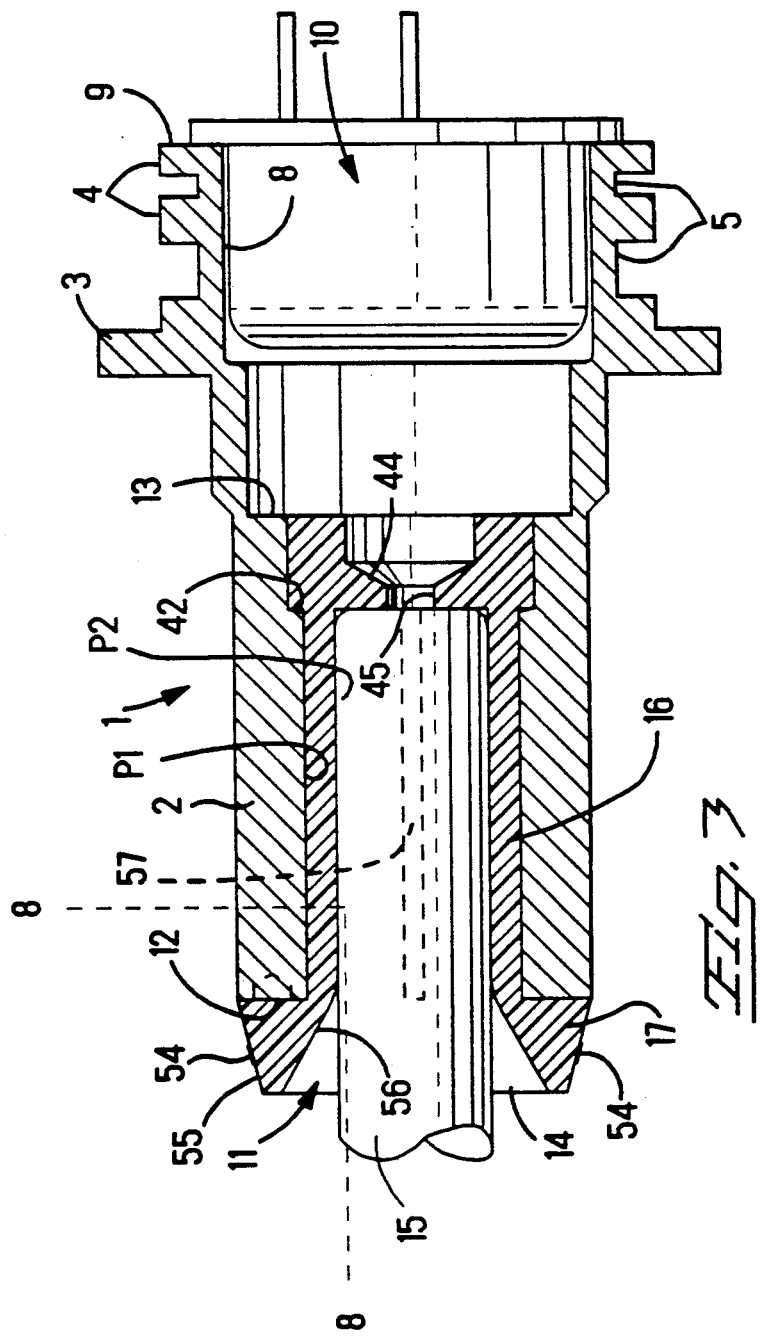
FIG. 3 is an enlarged elevation view in section of the active device mount shown in FIG. 1.

With more particular reference to FIGS. 1, 2 and 3, an active device mount 1 comprises a body 2 having a series of exterior flanges 3, 4 spaced apart by grooves 5 of different widths. The forward flange 3, the largest, is rectangular. The remaining smaller flanges 4 have corresponding rectangular portions 6 unitary with semicircular portions 7. Each of the grooves 5 follow the shape of the edges of the portions 6 and 7 of the smaller flanges 4. As shown, the body 2 is unitary. However, the body can be assembled from multiple parts, for example, as disclosed in the above referred to, U.S. Patent.

A stepped passage 8 through the body 2 communicates with a rear end 9 of the body 2 for receiving a known optoelectronic device 10, for example, a semiconductor architecturally configured as a laser, or a light emitting diode, or a light receiving diode, together with associated electronics in an electronic package. The appearance of the optoelectronic device 10 is disclosed in the U.S. Pat. No. '791 mentioned above.

A socket 11 at a front, entrance end 12 of the active device mount 1 communicates with the passage 9. The socket 11 has a step 13, FIG. 3, in its diameter facing rearward in the interior of the active device mount 1. An open entrance 14 of the socket 11 is for receiving a holder 15 for an optical fiber, the holder 15 being of the type disclosed in the U.S. Patent referred to above. The socket 11 of the active device mount 1 permits insertion and withdrawal of the holder 15 with respect to the optoelectronic device 10. The active device mount 1 operates to align the holder 15, and the optical fiber, in precise alignment with the optoelectronic device 10. Although precision is required, dimensional precision of the socket 11 is achieved by machining the socket 11 from stainless steel. Machining stainless steel is a widely practiced manufacturing technique. Thus, the active device mount 1 can be manufactured without unnecessary elevated cost by using materials more susceptible than are ceramics to being shaped by machining. One disadvantage has been seen when the stainless steel has been in rubbing contact with a ceramic, particularly a ceramic of light coloration. Stainless steel does not itself become visibly marred by an unsightly stain of its own oxide. Yet stainless steel is capable of applying marks by rubbing upon objects made of abrasive ceramic materials of lighter coloration. The stainless steel of the socket 11 applies visible dark stains or marks upon the ceramic holder 15 of lighter coloration whenever the ceramic holder 15 rubs against the socket 11 during its insertion and withdrawal.

According to the invention, a material 16 covers the socket 11 interior and the entrance end 12 of stainless steel. The material 16 is molded with a lip 17 projecting from the entrance end 12 of stainless steel. The material 16 prevents a rubbing mark, or stain, from being applied on the holder 15 by the stainless steel. The material 16 is sufficiently rigid to resist deformation when engaged by the holder 15. Deformation would be detrimental to a requirement that the socket 11 resist movement of the holder 15 from a position of precise alignment in the socket 11. One material 16 that is suitable, is a polymer, polyethersulphone, PES, having a behavior at room temperature as that of a traditional engineering thermoplastic, tough, rigid, and strong, and possessing outstanding long term, load bearing properties. A suitable brand "Victrex" PES and injection molding processing information are available from ICI Advanced Materials, Wilmington, Del. 19897. Telephone 1-800-VICTREX.

Figure 4:
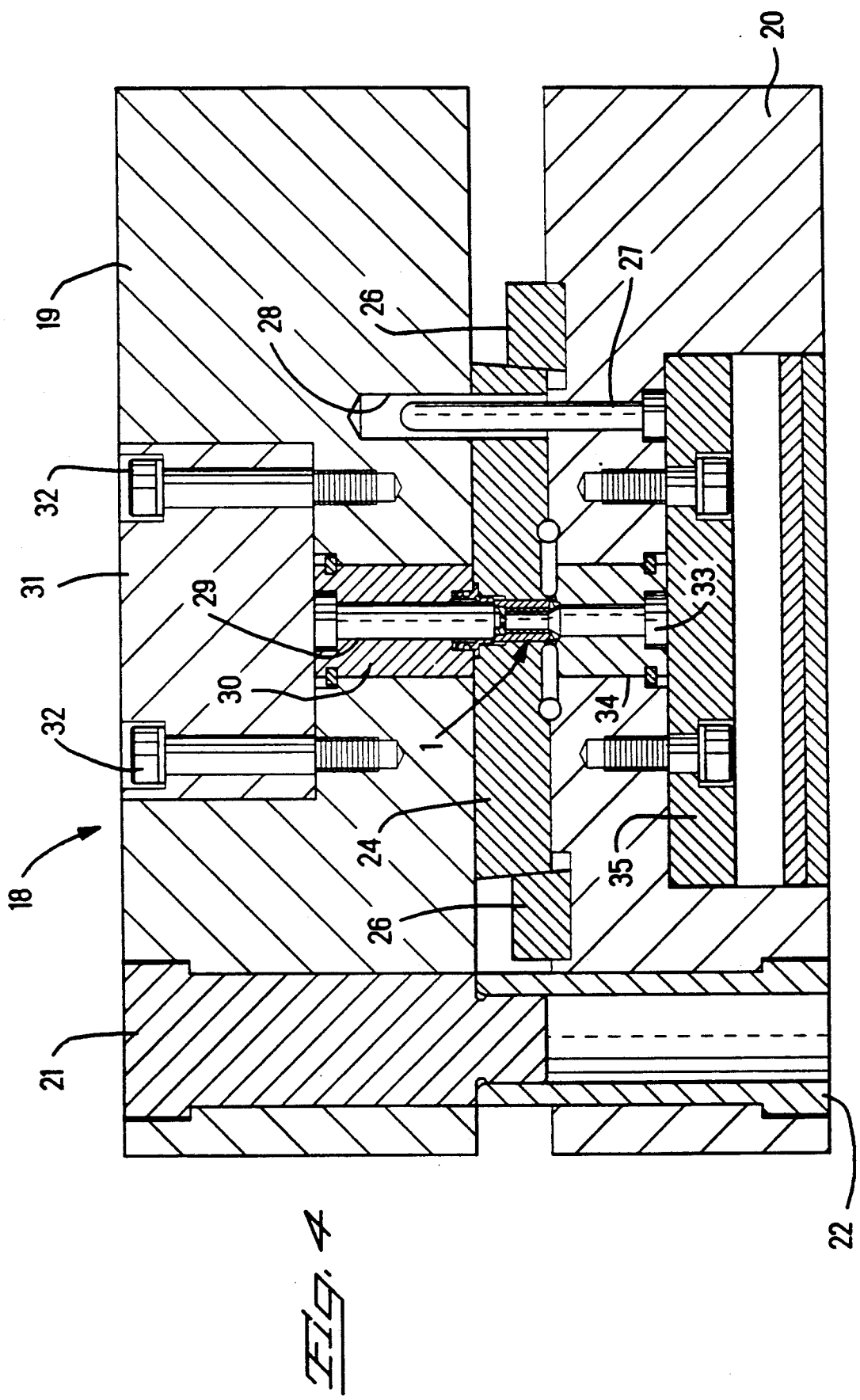
FIG. 4 is an elevation view in section of a portion of an apparatus for molding.

With reference to FIGS., 4, 5 and 6, molding apparatus 18 comprises a first "A" side molding die 19 and a second "B" side molding die 20. The dies 19, 20 are moved together and apart in the molding apparatus 18, in a known manner of operation. In FIG. 4 is shown a guide pin 21 in the "A" side die 19 aligned for receipt in a corresponding guide bushing 22 in the "B" side die 20. Cartridge heaters, not shown, are mounted in openings 23, FIG. 5.

Figure 6:
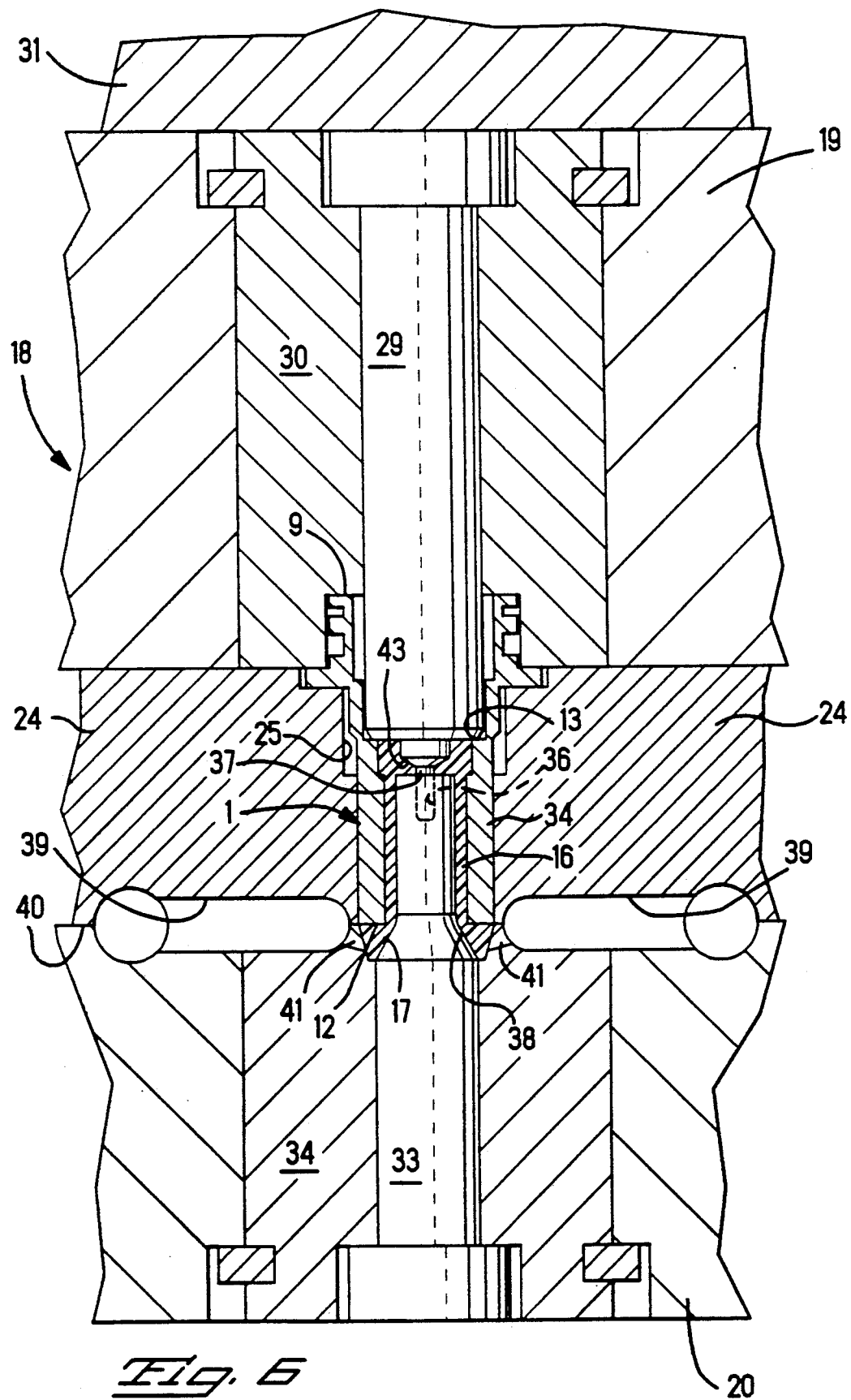
FIG. 6 is an enlarged fragmentary view of a portion or the apparatus shown in FIG. 5.

Between the dies 19, 20 is a hand insert 24, a machined block, with a cavity 25, FIG. 6, to hold, and to close against, the exterior of the active device mount 1 that is removably set in the cavity 25. End blocks 26, FIG. 4, are inset in the "B" side die 20 and position the hand insert 24. FIG. 4 shows a guide pin 27, for the hand insert 24, in the "B" side die 20 and passing through the hand insert 24 and received in a corresponding recess 28 in the first die.

An "A" side core pin 29 is mounted in a core pin retainer 30, in turn, mounted in the "A" side die 19. A first backup plate 31 is secured by bolts 32 to the "A" side die, and holds the core pin 29 and retainer 30. The "A" side core pin 29 enters the open rear end 9 of the active device mount 1 and closes against the step 13 in the diameter.

A "B" side core pin 33 is mounted in a core pin retainer 34, in turn, mounted in the "B" side die 20. A backup plate 35 is secured by bolts to the "B' side die 20 and holds the "B" side core pin 33 and retainer 34. The core pin 33 enters the socket 11 of the active device mount 1. In a front end of the "B" side core pin 33 is a pilot hole 36, FIG. 6. The "A" side core pin 29 has a reduced tip 37 that is tightly received in the pilot hole 36. Thereby, the core pins 29, 33 close against each other. The pilot hole 36 also receives gasses displaced during the molding operation.

The "B" side core pin 33 is concentric within the active device mount 1. A mold cavity 38 is formed in a space near the entrance end 12 of the socket 11, encircling around the "B" side core pin 33. Molten polymer material 16 is introduced through runners 39, FIG. 6, extending at a parting line 40 between the hand insert and the "B" side die. The runners connect with tunnel gates 41 that communicate with the mold cavity 38 to introduce molten polymer material 16 over the core pins 29, 33 and to cover the entrance end 12, and to cover the interior of the socket 11. Molten material 16 forms in a space between the "B" side core pin 33 and the body 2, and forms in the mold cavity 38 to form the lip 17 covering the open end of the socket 11. The material 16 is molded with the lip 17 projecting from the entrance end 12.

The material 16 conforms to the surface of the entrance end 12 to resist movement in a rearward direction. The material 16 conforms to the surface of an interior step 42, FIG. 3, in the diameter of the body 2 to resist movement in a forward direction. Thus, the interior step 42 and the entrance end 12 provide spaced apart shoulders of the body 2. The material 16 is restrained from movement by extending continuously between the shoulders, and by conforming to the shoulders.

Further, the material 16 forms against a conical portion frustrum 43 of the "A" side core pin 29 to form an interior bulkhead 44 within the body 2 that braces the material 16 at the interior step 42. An aperture 45 in the bulkhead 44 is formed by the tip 37 of the "A" side core pin 29. Thus, molten material 16 forms around the core pins 29, 33 with the core pins 29, 33 engaged to form an aperture 45 through the material 16.

Figure 5:
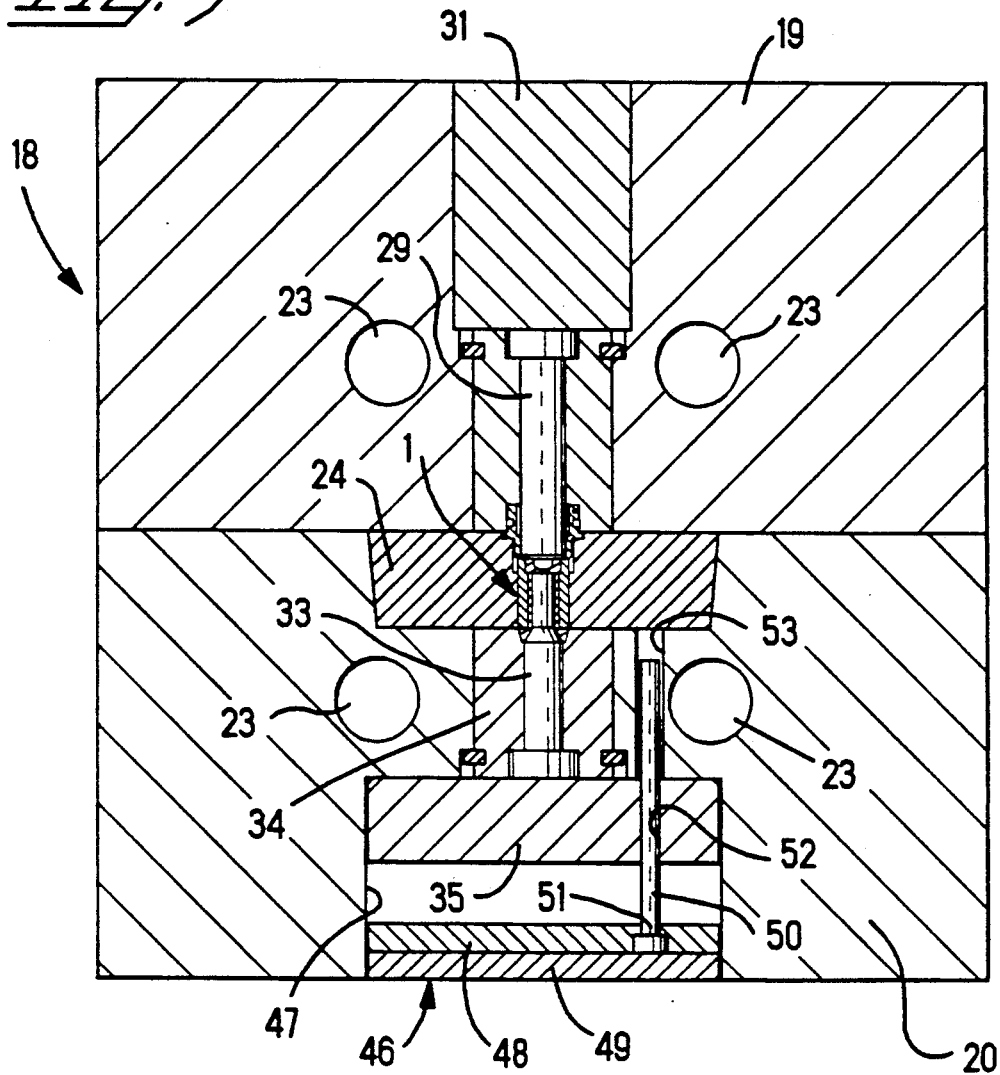
FIG. 5 is an enlarged view of a portion of the apparatus shown in FIG. 4.

With reference to FIG. 5, an ejector plate 46 reciprocates in a space 47 in the "B" side die, and includes a retainer plate 48 and an ejector backup plate 49. One of a number of ejector pins 50 is mounted in a corresponding guide 51 passing through the retainer plate 49. The ejector backup plate 49 engages enlarged heads of the ejector pin 50 to hold the pin 50 in the retainer plate 48.

The pin 50 extends through a corresponding guide passage 52 through the "B" side backup plate 35 and along ejector pin cavities 53 in the "B" side die 20, to engage the hand insert 24. After the molten material 16 is solidified, the dies 29, 33 open, by moving apart, not shown. The ejector plate 46 is reciprocated in the space 47, shown in FIG. 5, to move the ejector pin 50 in a direction to eject the hand insert 24 away from the "B" side die 33. The hand insert 24 lifts against the flange 3 of the active device mount 1, and both the hand insert 24 and the active device mount 1 are removed from the "B" side core pin retainer 34 that remains stationary with the "B" side die. Thereby, the solidified material 16 in the tunnel gates 41, FIG. 6, is sheared, leaving mold vestiges 54, FIGS. 2 and 3, joined to the lip 17. As shown in FIGS. 2 and 3, the lip 17 has the exterior mold vestiges 54 where the material 16 in the gates 41 have been sheared. The lip 17 has an exterior 55 that is chamfered or tapered, thus, recessing the mold vestiges 54 from the advantageously smooth outer profile of the socket 11. The larger diameter profile of the tapered lip 17 is flush with the outer profile of the front end of the socket 11.

The lip 17 has a tapered, funnel entry 56 for the socket 11. The material 16 covering the funnel entry 56 and the interior of the socket 11 is devoid of mold vestiges that otherwise would inhibit alignment of the holder 15. The material 16 covering the interior of the socket 11 has sufficiently accurate dimensions to align the holder 15. These dimensions are attained by machining smooth surfaces on the core pins 29, 33 against which the molten material 16 is formed.

The surface of the funnel entry 56 is convergent curved, rather than right conical, to eliminate intersections of one surface with another that would cause undesired corner edges at such intersections.

Figure 7:
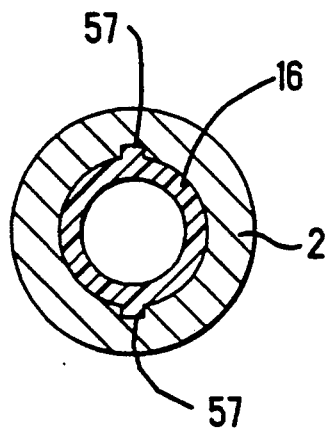
FIG. 7 is a section view taken along line 7—7 of FIG. 1.

The interior of the socket 11 is provided with grooves 57, FIG. 7, into which the material 16 flows. The material 16 conforms to the grooves and is prevented from rotation relative to the socket 11. Thus, the socket 11 is provided with means in the form of at least one groove to prevent the relative rotation. Other means, such as a flat, recessed surface of the socket 11 can prevent the relative rotation.

Figure 8:
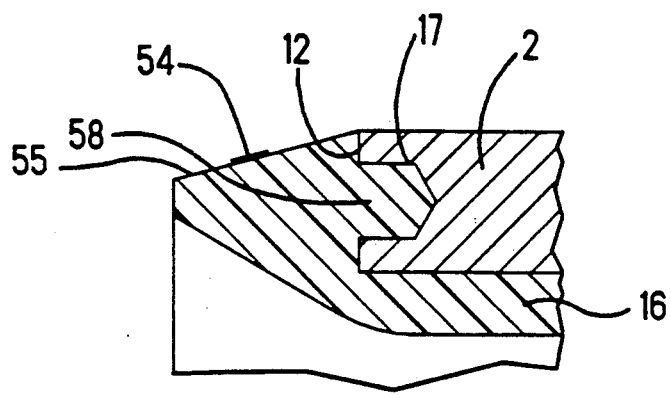
FIG. 8 is a section view taken along lines 8—8 of FIG. 3, showing an alternative embodiment of the device of the invention.

In FIG. 8, an alternative embodiment directed to this end of preventing rotation, in the form of an aperture 58 in the entrance end 12 of the socket, is included. This aperture would be in lieu of grooves 57 in the interior of the socket and upon molding as previously described, the material 16 would fill 58 as at 17. It has been discovered that in certain, but not all, applications where the roundness of the bore, namely passage P1 and the passage 9, and passage P2 as shown in FIGS. 1 and 3, is particularly critical, the use of interior grooves 57 can cause a certain lack of roundness of the bore passage P2. This is believed to be due to heat transfer/surface area phenomena related to the volume of the material 16 and the interruption of the radius of the interior passage P1 of body 2 by interior grooves. An aperture 58 included in the end face of body 2, entrance end 12, not only does not interrupt the interior passage P1 of body 2, but is of a volume which is insignificant as compared to the total volume of the molded material 16. In one embodiment, volume of an aperture 58 has a depth on the order of 0.025 inches in a device having a total volume of a diameter measured in quantities of hundreds of a thousandths of an inch in length and also in outer diameter. The resulting liner 16 was rendered with a passage P2 which was not only coaxial with P1, but maintained precise cylindrical roundness of the interior surface, important in positioning holder 15. The invention contemplates that more than a single aperture 58 can be employed in the end entrance 12, as for example, two or three apertures. The placement of end entrance 12 should be balanced, evenly displaced around the end periphery, and its volume to be filled by the material 59, shown in FIG. 8, should be limited to on the order of less than 1% of the volume of the liner.

Figure 9:
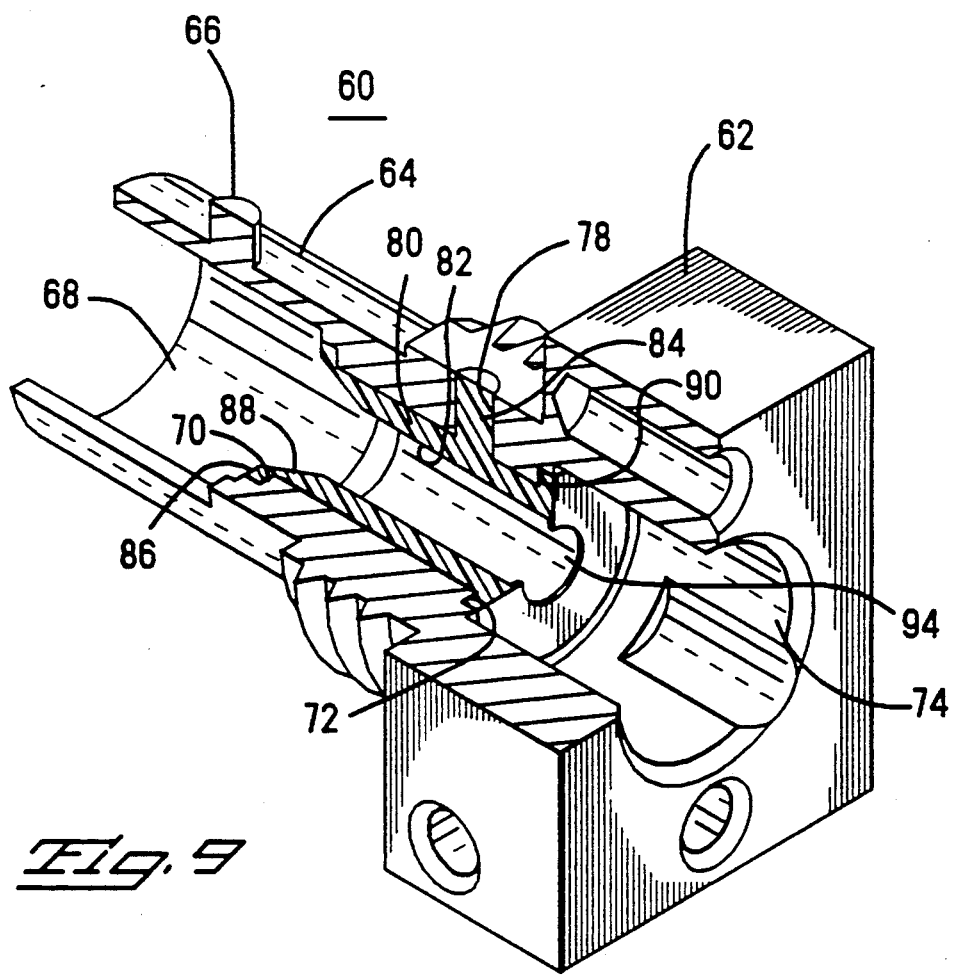
FIG. 9 is a perspective, in partial section, of a bayonet embodiment of the invention as a further alternative.

FIG. 9 shows a further embodiment in relation to a bayonet fitting 60. The bayonet fitting 60 includes a body 62 having a forward projecting cylindrical portion 64 shown with one of a pair of bayonet prongs 66 adapted to engage a complementary surface and bayonet connected with a mating connector. Interior of body portion 64 is a bore 68 which includes a step face 70 at the entry end thereof and a step face 72 at the exit end of such bore. Adjacent step face 72 is a further passage 74 which exits the body of 60. Shown in FIG. 9 in the top portion thereof, is a small aperture 78 extending from the interior of the bore 68 to the exterior of the body portion 64. As can be discerned from FIG. 9, the bore 68 includes a material molded therein in the form of a liner 80 which includes an interior bore 82. The bore 82 is similar to passage P2 with respect to the material 16 of the embodiment shown in FIGS. 1-7.

As can be discerned from FIG. 9, a small bore 78 accommodates a plastic material 84 and the bore 78 may indeed be utilized to inject the plastic forming 80, it being understood that core pins entering through the bore 78 defining the interior bore 82 and entering the bore passage 74 abutting such core pin and defining the end face of 80 would be employed with suitable venting, not shown. The amount of material in 84, forming in a sense a sprue, left internally of the bore 78 and in place in bayonet half 60 is slight compared to 80 but serves to provide an anti-rotation feature. The ends of the material forming 80, shown as 86 and as 90 engage in surfaces 70 and 72 of the interior of half 60 to lock the material forming 80 in place. Further including is an interior tapered surface 88 which is free of mold vestiges in the embodiment as shown in FIG. 9. More than one bore 78 is contemplated, as for example, a second bore spaced across the device and opposite bore 78.

We claim:

1. An active device mount, comprising: a body for receiving an optoelectronic device and having a socket for receiving a holder for an optical fiber, an interior and an entrance end of the socket being covered with a material resisting deformation by receipt of the holder in the socket, the material being molded with a lip projecting from the entrance end, the lip having exterior mold vestige, the material covering the interior preventing a stain from being applied on the holder by the socket, and at least an aperture extending into the socket with said material being molded into said aperture.

2. The active device mount as recited in claim 1, wherein the aperture is of a volume which is slight relative to the volume of said material, and the aperture is filled with the said material upon said material being molded.

3. A method for molding an active device mount, comprising the steps of: holding an alignment body of an active device mount within molding dies of a molding apparatus, the body having a socket for receiving a holder of an optical fiber in alignment with an optoelectronic device, inserting a first core pin in the body, inserting a second core pin in the body, forming molten material into a space between the second core pin and the body, forming molten material between the second core pin and an open end of the socket to form a lip covering the open end of the socket, and providing at least one small aperture in the socket to be filled with molten material during said step of forming said molten material.

4. A method of locking a plastic liner against rotation in a coaxial body of a type having a central coaxial bore therein comprising the steps: holding said body in a mold of a molding apparatus, inserting core pin means into said bore of a diameter less than that of said bore to define a coaxial volume between the said core pin means and the interior surface of said bore to define said liner, injecting molten material into said bore to fill said volume and further including the provisionary steps of providing an aperture in said body positioned to be filled by said material and defining said liner, said aperture having a volume which is a small fraction of the volume of material injected whereby to minimize loss of roundness of said liner.

5. The method of claim 4 wherein the said aperture has a volume on the order of less than 1 percent of the volume of said liner.

6. The method of claim 4 wherein the said coaxial body includes an end face which includes aperture means in the end face adapted to be filled with the said plastic material to prevent rotation of the liner relative to the body.

7. The method of claim 4 wherein the said aperture is in a side wall of the said coaxial body.

8. The method of claim 4 wherein the said aperture is spaced apart from the surface of the said bore to preclude a distortion of roundness of said liner.

* * * * *

UNITED STATES PATENT AND TRADEMARK OFFICE
CERTIFICATE OF CORRECTION

PATENT NO. : 5,093,878

DATED : March 3, 1992

INVENTOR(S) : Edmund J. Haley, et al

It is certified that error appears in the above-identified patent and that said Letters Patent is hereby corrected as shown below:

In the ABSTRACT, Line 5, after "covered" and before "from" insert

-- with a material 16 molded with a lip 17 projecting --.

Signed and Sealed this

Twenty-ninth Day of June, 1993

Attest:

MICHAEL K. KIRK

Attesting Officer

Acting Commissioner of Patents and Trademarks